United States Patent Office 3,386,173
Patented June 4, 1968

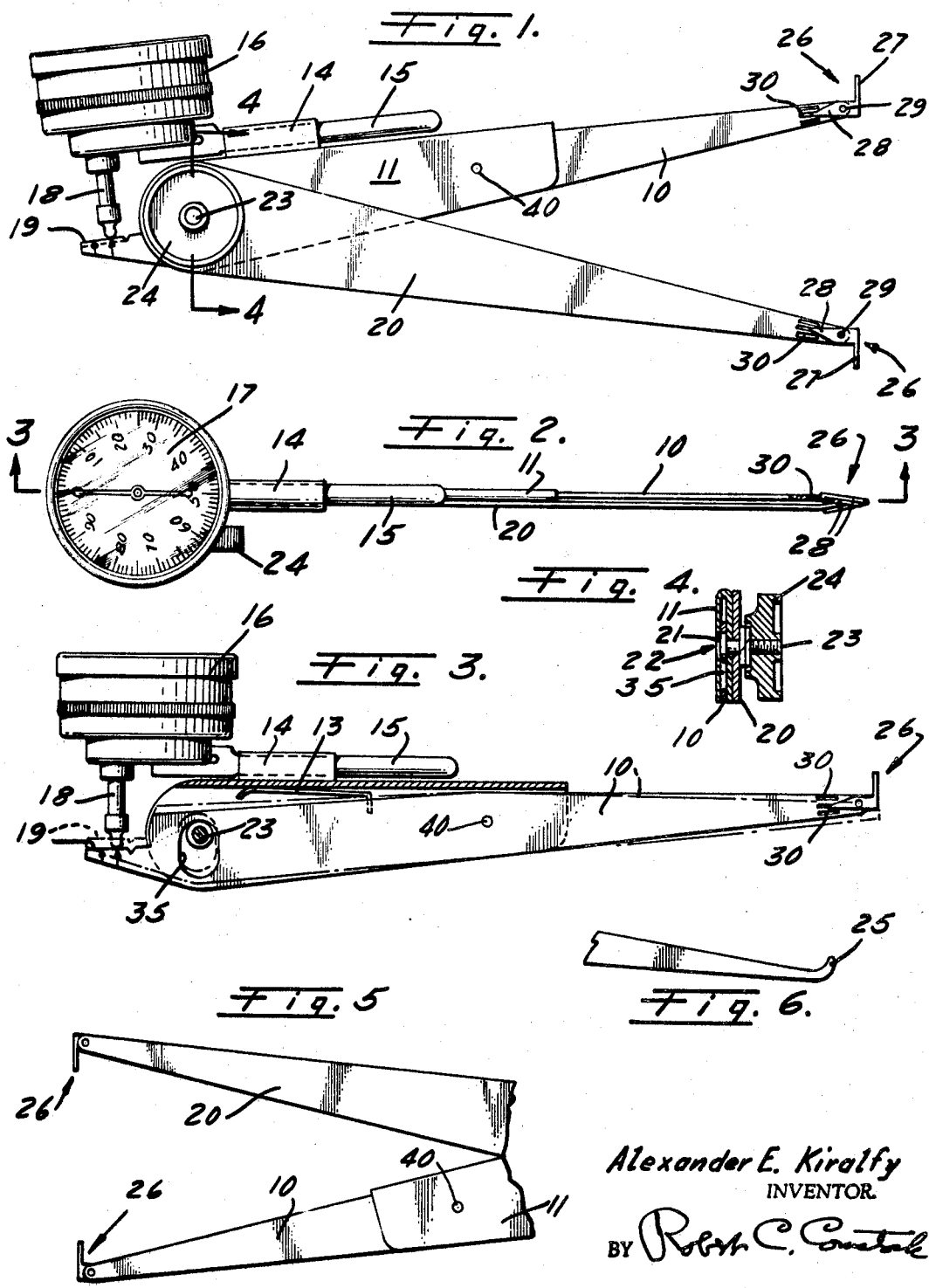

3,386,173
DIAL READING CALIPERS
Alexander Enrico Kiralfy, 823 Wellesley Ave.,
Los Angeles, Calif. 90049
Filed June 25, 1965, Ser. No. 466,916
10 Claims. (Cl. 33—148)

This invention relates to dial reading calipers.

It is an object of my invention to provide dial reading calipers which are capable of use for measuring inside and outside dimensions and for measuring the dimensions of ring grooves, both inside and outside.

Another object of my invention is to provide such calipers which are adjustable for an extremely wide range of measurements without requiring any additional accessories of any kind.

A further object of my invention is to provide dial reading calipers of the type described which provide readings to a high degree of accuracy.

It is another object of my invention to provide such calipers in which means are provided to compensate for slight errors which are introduced in moving between small and large dimensions.

It is also an object of my invention to provide dial reading calipers which are easily and rapidly adjusted for various dimensions and which can be easily and rapidly converted between reading inside and outside dimensions.

My invention also comprises such other objects, advantages and capabilities as will later more fully appear and which are inherently possessed by my invention.

While I have shown in the accompanying drawings preferred embodiments of my invention, it should be understood that the same are susceptible of modification and change without departing from the spirit of my invention.

Referring to the drawings,

FIG. 1 is a side elevational view of my dial reading calipers;

FIG. 2 is a top plan view of the same;

FIG. 3 is a longitudinal sectional view of the same, taken along line 3—3 of FIG. 2, and omitting the third leg;

FIG. 4 is a transverse sectional view of the same, taken along line 4—4 of FIG. 1;

FIG. 5 is a partial side elevational view of the ends of the legs in reversed position for measuring an outside diameter or ring groove;

FIG. 6 is a side elevational view of the end of one leg, showing an alternative fixed foot.

A preferred embodiment which has been selected to illustrate my invention comprises an elongated inner leg 10, a portion of which is mounted within a shorter U-shaped outer leg 11. A pivot pin 40 connects the inner leg 10 for a slight degree of pivotal movement with respect to the outer leg 11. In the embodiment shown in the drawings, the work engaging end of the inner leg 10 is capable of moving through a range of approximately .2 inch.

An elongated wire spring 13 is secured at one end to the upper portion of the leg 10. It extends above and substantially parallel to the upper edge of the inner leg 10. The opposite end of the spring 13 is free and bears against the inside of the outer leg 11. The spring 13 accordingly acts to normally urge its end of the inner leg 10 away from the outer leg 11.

An elongated tube 14 is mounted on the top of the outer leg 11 extending through the tube 14 is the cylindrical arm 15 of a dial indicator gauge 16. The arm 15 is held by friction fit, so that the gauge 16 is normally held in a fixed position but is capable of being moved longitudinally with respect to the outer leg 11.

The gauge 16 includes an upwardly directed dial face 17 and a downwardly directed control pin 18. The vertical movement of the control pin 18 is accurately measured by the rotational movement of an indicator on the dial face 17. The dial indicator gauge 16 may be of a suitable conventional type known to the art and available to the commercial market, such as a Starrett gauge.

The end of the inner leg 10 which is disposed adjacent to the gauge 16 is provided with a laterally directed flange 19, which engages the tip of the control pin 18. Since the gauge 16 is fixedly secured with respect to the outer leg 11, any pivotal movement of the inner leg 10 with respect to the outer leg 12 results in movement of the control pin 18. The flange 19 and control pin 18 are preferably oriented so that they engage each other at approximately a right angle.

A third leg 20 is connected to the inner leg 10 and outer leg 11 adjacent to the gauge 16. The outer leg 11 is provided with an opening in which the head 21 of a screw 22 is fixedly mounted in a manner preventing any movement of the outer leg 11 with respect to the screw 22. The threaded shank 23 of the screw 22 extends through a complementary circular opening in the adjacent end of the third leg 20. A knurled thumb nut 24 is rotatably mounted on the end of the shank 23.

When the thumb nut 24 is loosened, the third leg 20 can be pivoted with respect to the inner leg 10 and outer leg 11. When the thumb nut 24 is tightened, however, it bears against the side of the third leg 20 and prevents such movement, so that the third leg 20 is fixedly held with respect to the outer leg 11.

The end of the inner leg 10 is provided with an elongated slot 35 which surrounds the screw 22 and which permits limited pivotal movement of the inner leg 10 with respect to the outer leg 11.

The ends of the inner leg 10 and the third leg 20 remote from the gauge 16 each carry a foot which is adapted to engage the surface of the object being measured. This engaging foot may comprise a fixed foot 25 or an adjustable foot 26.

The adjustable foot 26 provides several advantages not found in the fixed foot 25. The adjustable foot 26 is capable of being adjusted so that the portion thereof which engages the work always extends at substantially a right angle with respect to the work. This provides more accurate measurement of the object when measuring inside dimensions and compensates for the slight amount of error which is introduced when the legs are opened a substantial distance.

This error results from the fact that the legs form a different angle with respect to the work as they are moved to a different position. The amount of error is proportional to the cosine of the difference in the angle of the legs with respect to the work. Compensation for this error can be made to a large degree when measuring inside dimensions only by providing an adjustable foot which is adjusted upon movement of the legs so that the foot always engages the work at substantially a right angle. The adjustment of the foot tends to counteract the error introduced by rotation of the leg.

Any suitable structure may be used to provide an adjustable foot 26. In the drawings, the embodiment shown comprises an adjustable foot 26. In the drawings, the embodiment shown comprises and adjustable foot 26 which includes an elongated work engaging pin 27 and an integral triangular base 28, which are disposed on opposite sides of a pivot 29. The base 28 extends adjacent to the end of the leg 10 or 20 and has a portion which is adapted to fit into any one of a plurality of spaced indentations 30 formed in the side of the leg 10 or 20. (Raised portions may also be used, with the base 28 extending between them.) The foot 26 is pivoted on the pivot 29 to change the angle of the pin 27, with the base 28 acting to hold the foot 26 in the position to which it is moved. Any suitable conventional means such as a fastening member or a spring or friction may be used to prevent the foot 26 from accidental displacement.

Compensation for the error introduced by movement of the legs may also be provided at the opposite end of the calipers by longitudinal sliding movement of the gauge 16 along the outer leg 11. The end of the inner leg 10 beneath the flange 19 may be provided with two or more index marks 32 to designate the proper positioning of the control pin 18 for different dimensional setting of the legs.

In use, my dial reading calipers can be used to read inside or outside diameters and to read the dimensions of ring grooves, both inside and outside. The last described type of error compensation may be used when reading either inside or outside dimensions, while the adjustable foot is used only when reading inside dimensions. In reading inside dimensions, it is accordingly possible to use either type of error compensating means or to use both of them simultaneously.

The embodiment of my invention which is shown in the drawings, in which the inner leg 10 and third leg 20 are each approximately 6 inches long from the screw 22 to the feet 25 or 26, is adjustable to measure dimensions over a range from approximately ½ inch to 5 inches, without additional accessories of any kind.

My calipers may be used by adjusting the legs to fit a ring gauge of known dimensions, with the dial indicator gauge 16 set to zero. The calipers are then transferred to the part being measured, with the inner leg 10 begin deflected with respect to the outer leg 11 to cause the gauge 16 to indicate the difference between the diameter being measured and the known dimension of the ring gauge.

My calipers can also be set by reference to a micrometer and the gauge 16 will then read the variation from the desired or pre-set dimension of the micrometer.

When my calipers are to be used for measuring inside diameters or ring grooves, the feet 25 or 26 are directed outwardly away from each other. The foot 25 or 26 on the end of the inner leg 10 is then normally held in an outward position. The foot can be moved inwardly, causing the opposite end of the inner leg 10 to move toward the outer leg 11 against the urging of the spring 13. The inner leg 10 is pivotally mounted on the pivot pin 40 and the slot 25 permits such movement.

When my calipers are to be used for measuring outside diameters or ring grooves, the legs must be oriented so that the feet 25 or 26 are directed inwardly toward each other. In order to change the calipers, all that is required is to loosen the thumb nut 24 and pivot the third leg 20 to reverse its position with respect to the inner leg 10, so that the feet 25 or 26 are now directed inwardly. The calipers may then be used in the same manner described above.

As mentioned above, the inner leg 10 is capable of limited pivotal movement against the urging of the spring 13. The gauge 16 may be set, as desired, to a zero reading at the normal position of the inner leg 10 or at any position between its normal position and its limit of movement.

A split ring lock washer may be provided between the thumb nut 24 and the third leg 20 surrounding the screw 22, to provide better locking of the thumb nut 24.

The work engaging ends of the inner leg 10 and the third leg 20 are preferably curved slightly toward each other in a slightly transverse direction in order to bring the feet 25 or 26 into axial alignment with each other.

I claim:

1. A dial reading calipers comprising an elongated inner leg disposed within a shorter U-shaped outer leg, a pivot pin mounting said inner leg for pivotal movement with respect to said outer leg, an elongated spring connected at one end thereof to one end of said inner leg, said spring extending substantially parallel to the upper edge of said inner leg, the opposite end of said spring being free and bearing against the inside of said outer leg to normally urge the ends of said legs carrying said spring apart from each other, a dial indicator gauge mounted on said outer leg, said gauge having a control pin, a flange carried by the end of said inner leg adjacent to said gauge, said flange engaging said control pin at substantially a right angle, a third leg connected to said outer leg adjacent to said gauge, a fastening member extending through all three of said legs, said inner leg having a slot surrounding said fastening member whereby said inner leg may be pivoted to a limited degree with respect to said outer leg, a manually operated nut threaded on said fastening member, said nut when loosened permitting pivotal movement of said third leg with respect to said inner and outer legs, including reversing the positions of said legs with respect to each other to change between measuring inside and outside dimensions, said nut when tightened frictionally engaging said third leg to prevent pivotal movement thereof with respect to said inner and outer legs, and a pair of work engaging feet, one carried by the end of said inner leg remote from said gauge and the other carried by the end of said third leg remote from said gauge, the distance between said pivot pin and said control pin being substantially equal to the distance between said pivot pin and the foot carried by said inner leg.

2. The structure described in claim 1, and means for compensating for errors introduced by extensive pivotal movement of said legs comprising means mounting said dial indicator gauge for sliding movement along the longitudinal axis of said outer leg, and index means for designating the longitudinal movement of said indicator gauge.

3. The structure described in claim 1, each of said work engaging feet being rotatably mounted on its respective leg, whereby said feet may be adjusted to extend at substantially a right angle with respect to the work, regardless of the pivotal movement or positioning of said legs.

4. A dial reading calipers comprising an elongated inner leg and an elongated outer leg, a pivot pin mounting said inner leg for pivotal movement with respect to said outer leg, a dial indicator gauge carried by said outer leg, said gauge having a control pin, means carried by the adjacent end of said inner leg for engaging said control pin, a third leg connected to said outer leg adjacent to said gauge, fastening means to selectively permit or prevent pivotal movement of said third leg with respect to said inner and outer legs said inner leg having a slot surrounding said fastening member to permit limited pivotal movement of said inner leg with respect to said outer leg, said inner leg having a slot surrounding said fastening member to permit limited pivotal movement of said inner leg with respect to said outer leg, resilient means normally urging said inner leg in one direction with respect to said outer leg, and a pair of work engaging feet carried by the end of said inner leg and the end of said third leg remote from said gauge, the distance between said pivot pin and said control pin being substantially equal to the distance between said pivot pin and the foot carried by said inner leg, the respective positions of said third and inner legs being reversible, to reverse the direction of said feet for measuring both inside and outside dimensions.

5. The structure described in claim 4, and means for compensating for errors introduced by extensive pivotal movement of said legs comprising means mounting said dial indicator gauge for movement along the longitudinal axis of said outer leg.

6. The structure described in claim 4, each of said work engaging feet being adjustable to extend at substantially a right angle with respect to the work, regardless of the pivotal movement or positioning of said legs.

7. A dial reading calipers comprising an elongated inner leg disposed within a shorter U-shaped outer leg, means mounting said inner leg for limited pivotal movement with respect to said outer leg, and elongated spring connected at one end thereof to one end of said inner leg, said spring extending substantially parallel to the upper edge of said inner leg, the opposite end of said spring being free and bearing against the inside of said outer leg to normally urge the ends of said legs carrying said spring apart from each other, a dial indicator gauge mounted on said outer leg, said gauge having a control pin, a flange carried by the end of of said inner leg adjacent to said gauge, said flange engaging said control pin, a third leg connected to said outer leg adjacent to said gauge, fastening means normally preventing pivotal movement of said third leg with respect to said inner and outer legs, said inner leg having a slot surrounding said fastening member to permit limited pivotal movement of said inner leg with respect to said outer leg, said fastening means when loosened permitting pivotal movement of said third leg with respect to said inner and outer legs, including reversing the positions of said legs with respect to each other to change between measuring inside and outside dimensions, and a pair of work engaging feet, one carried by the end of said inner leg remote from said gauge and the other carried by the end of said third leg remote from said gauge.

8. A dial reading calipers comprising an elongated inner leg disposed within a shorter U-shaped outer leg, pivot means mounting said inner leg for pivotal movement with respect to said outer leg, a dial indicator gauge mounted on said outer leg, said gauge having a control pin, a flange carried by the end of said inner leg adjacent to said gauge, said flange engaging said control pin, resilient means urging said flange away from said control pin, a third leg connected to said outer leg adjacent to said gauge, fastening means normally preventing pivotal movement of said third leg with respect to said inner and outer legs, said inner leg having a slot surrounding said fastening member to permit limited pivotal movement of said inner leg with respect to said outer leg, said fastening means when loosened permitting pivotal movement of said third leg with respect to said inner and outer legs, including reversing the positions of said legs with respect to each other to change between measuring inside and outside dimensions, and a pair of work engaging feet, one carried by the end of said inner leg remote from said gauge and the other carried by the end of said third leg remote from said gauge.

9. A dial reading calipers comprising an elongated inner leg and an outer leg, said inner leg being mounted for limited pivotal movement with respect to said outer leg, a dial indicator gauge mounted on said outer leg, said gauge having a control pin, means carried by said inner leg engaging said control pin, resilient means normally urging said pin engaging means away from said control pin, a third leg connected to said outer leg adjacent to said gauge, fastening means normally preventing pivotal movement of said third leg with respect to said inner and outer legs, said inner leg having a slot surrounding said fastening member to permit limited pivotal movement of said inner leg with respect to said outer leg, said fastening means when loosened permitting pivotal movement of said third leg with respect to said inner and outer legs, including reversing the positions of said legs with respect to each other to change between measuring inside and outside dimensions, and a pair of work engaging feet, one carried by the end of said inner leg remote from said gauge and the other carried by the end of said third leg remote from said gauge.

10. A dial reading calipers comprising an elongated inner leg and an elongated outer leg, means permitting limited pivotal movement of said inner leg with respect to said outer leg, resilient means normally urging said inner leg in one direction with respect to said outer leg, a dial indicator gauge carried by said outer leg, said gauge having a control pin, means carried by the adjacent end of said inner leg for engaging said control pin, a third leg connected to said outer leg adjacent to said gauge, fastening means to prevent pivotal movement of said third leg with respect to said inner and outer legs, said inner leg having a slot surrounding said fastening member to permit limited pivotal movement of said inner leg with respect to said outer leg, a pair of work engaging feet carried by the end of said inner leg and the end of said third leg remote from said gauge, the respective positions of said third and inner legs being reversible, to reverse the direction of said feet for measuring both inside and outside dimensions.

References Cited

UNITED STATES PATENTS

| | | | |
|---|---|---|---|
| 447,805 | 3/1891 | Yanda | 33—149 |
| 1,285,175 | 11/1918 | Hinkle | 33—148 |
| 1,324,870 | 12/1919 | Zito | 33—148 |
| 1,633,875 | 6/1927 | Sweeney | 33—149 |
| 1,750,486 | 3/1930 | Nolder | 33—149 |
| 2,322,951 | 6/1943 | Menzer | 33—148 |
| 2,395,154 | 2/1946 | Thulin | 33—148 |
| 2,502,051 | 3/1950 | Kulcsar et al. | 33—148 |
| 2,514,024 | 7/1950 | Bernard | 33—148 X |
| 3,222,788 | 12/1965 | Neslund | 33—148 |

FOREIGN PATENTS 118,670   4/1947   Sweden.

WILLIAM D. MARTIN, JR., *Primary Examiner.*

LEONARD FORMAN, *Examiner.*